Nov. 24, 1925.
H. GINNEL
SHEARS
Filed Sept. 13, 1924
1,562,630
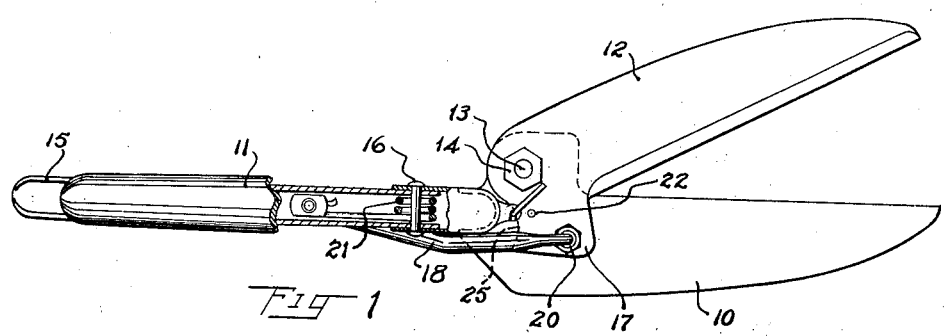
Fig. 1
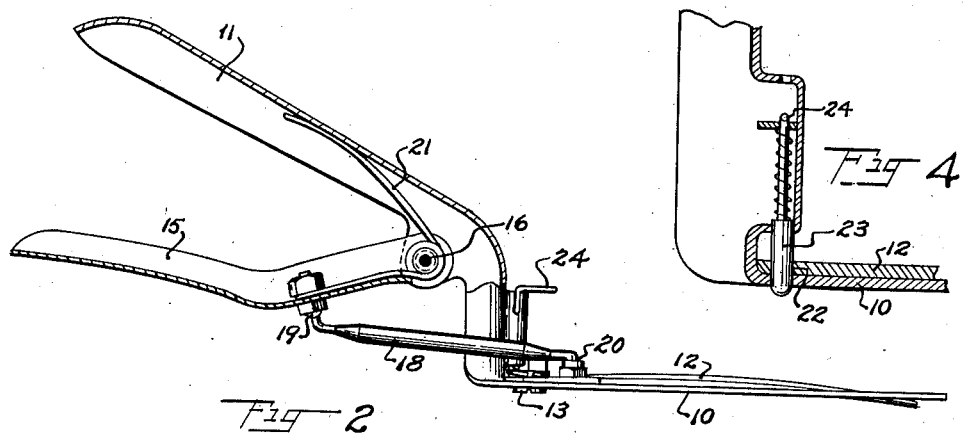
Fig. 2
Fig. 4
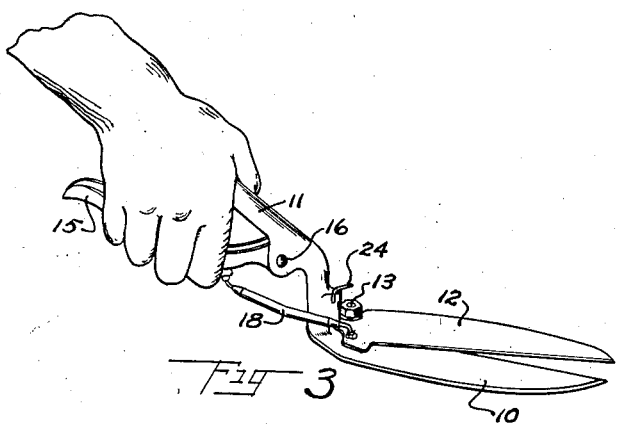
Fig. 3
INVENTOR
Henry Ginnel
BY J. S. Wooster
ATTORNEY Patented Nov. 24, 1925.

1,562,630

UNITED STATES PATENT OFFICE.

HENRY GINNEL, OF SCARSDALE, NEW YORK.

SHEARS.

Application filed September 13, 1924. Serial No. 737,456.

*To all whom it may concern:*

Be it known that I, HENRY GINNEL, a citizen of the United States, and a resident of Scarsdale, in the county of Westchester and State of New York, have invented certain new and useful Improvements in Shears, of which the following is a specification.

This invention relates to shears such as are used for trimming lawns, hedges, and the like and has for its object to provide a device of this class which is simple and easy to operate, is adapted to be moved in a straight line along a guiding surface with facility, and is not likely to skin the operator's knuckles when working along such guiding surface or a wall.

It has been suggested to locate the handles of grass shears in planes perpendicular to the blades for ease in operation, but no satisfactory shears of this type have been made. One such form on the market today is open to a number of objections, being of the type where both blades move and therefore not well adapted for following along a guiding surface or wall. Other objections to this particular type of shears are the excessive friction and likelihood of the cam slots in the back of the blades becoming clogged with dirt or grass.

According to this invention these objections have been overcome and a pair of shears provided having pivotally secured blade members, one of which is stationary and the other movable, a stationary handle rigidly secured to the stationary blade member, another handle member movable in a plane substantially normal to the plane of the blade members, and an actuating member for the movable blade connecting the movable handle member with a lateral projection on the movable blade.

In the accompanying drawings:

Figure 1 shows a top plan view of the shears with the handle partly in section,

Fig. 2 is a side elevation with the handle partly in section,

Fig. 3 is a perspective of the shears showing the method of operating, and

Fig. 4 is a section through the locking pin mechanism.

A fixed blade 10 is secured to a fixed handle member 11. The movable blade 12 is pivotally secured at 13 to the fixed blade by means of the nut and screw clamping mechanism 14 necessary to securely retain the blades in operative position owing to the usual curvature being given the movable blade for successful operation, as illustrated in Fig. 2. The movable handle member 15 is pivoted at 16 to the fixed handle member 11 for movement in a vertical plane, that is, a plane substantially normal to the plane of movement of the blades. The arrangement of the handle members is such that the path of the movable member does not extend laterally beyond the fixed handle member on the side thereof opposite to the movable blade member, or beyond the back or non-cutting edge of the fixed blade member. Thus, the back of the fixed blade can readily serve as a guide for the shears without subjecting the hand of the user to contact with the guiding surface. The movable blade member is provided with a projection 17 laterally extending from the pivot 13. An actuating member 18 connects the movable handle member 15 with the movable blade member 12 and is attached to the projection 17 in such manner that the cutting edge of the movable blade and the fixed handle member 11 both lie between the point of attachment 20 of the actuating member 18 and the pivot 13. This arrangement affords a substantial lever arm and yet enables the actuating member 18 to pass around the fixed handle member 11. Actuation of the movable handle member 15 raises and moves rearwardly the actuating member 18, so that this member possesses both translation and rotation and requires pivotal connection to both the movable handle member 15 and the movable blade member 12. Specifically, as illustrated in Fig. 2, these pivotal connections 19 and 20 comprise socket joints in the modification illustrated.

A spring 21 is coiled around the pivot 16 and engages both handle members to automatically separate them and open the blade members. This spring for opening the blade members may be located in other positions.

Perforations 22 are provided in the blade members and arranged to cooperate when the blades are closed, at which time a locking pin 23 may be inserted through the perforations 22 to retain the blade members in closed and locked position for safety in transportation. Some convenient form of handle 24 may be provided to facilitate entry of the locking pin 23.

In the embodiment illustrated, the movable blade member 12 is provided with a shoulder 25 adapted to engage the fixed handle member 11 and limit the closing movement of the blade 12. With the actuating member 18 arranged as illustrated it is adapted to engage the fixed handle 11 in limiting the opening movement of the blade 12, so that no separate stop member is necessary.

Among the advantages of this invention may be mentioned the provision of a simple reliable construction relatively free from friction and not liable to get out of order. Having the handles in a vertical plane enables the device to be operated with facility while the specific mechanism illustrated for conveying movement of the handles to the blades is a relatively simple construction not complicated by friction consuming parts such as extra links or pivots or cam slots. The location of the pivot 13 to one side of the cutting edges and the attachment of the actuating member 18 to the other side of the movable blade 12, enables a substantial leverage to be obtained for applying force to the movable blade by means of the simple mechanism illustrated free from the disadvantages of prior art devices. This location of the pivot 13 also enables a maximum lever arm to be obtained with the projection 17 for a minimum width of tool. The absence of any mechanism or projections on the underside prevents the shears from clogging. The curvature to the blades makes them self-cleaning. Either blade may be made stationary.

I claim:

1. Shears having pivotally secured blade members, one of which is stationary and the other movable, a stationary handle member having a single gripping portion secured to the stationary blade member, another handle member movable vertically when the blade members are in a horizontal plane, and means for actuating said movable blade member from the movable handle member.

2. A shears comprising a fixed blade member, another blade member pivotally movable toward and from the fixed blade member, a fixed handle member extending up from the plane of the fixed blade member, another handle member movable toward and from the fixed handle member in a different direction from the relative movement of said blade members and so mounted that its path of movement does not extend substantially laterally beyond the back or non-cutting edge of the fixed blade member, said handle members being arranged adjacent to the blade members for single hand operation thereof and far enough from at least a portion of the back or non-cutting edge of the fixed blade member to enable said blade member to follow a guiding surface while having the operator's hand between said fixed handle member and the guiding surface and means for actuating the movable blade member from the movable handle member.

3. A shears comprising a pair of blade members, one fixed and the other movable, fixed and movable handle members adjacent the blade members, the former being secured to the fixed blade member, means for pivotally securing the blades together, an actuating bar connecting the movable handle member and movable blade member and disposed at an acute angle to the handle member, a projection on said movable blade member extending laterally of said pivotal securing means and to which the actuating bar is attached, said bar being attached to the movable blade member and to the movable handle member by socket joints, one at each end of the bar whereby one end of the bar may be raised while the other end swings about the pivotal securing means, and means for opening the blades.

Signed at New York city in the county of New York and State of New York this 11th day of September A. D. 1924.

HENRY GINNEL.